United States Patent
Step

[11] Patent Number: 5,915,630
[45] Date of Patent: Jun. 29, 1999

[54] MULTI-PURPOSE STRAP FASTENER

[75] Inventor: Martin P. Step, Kitchener, Canada

[73] Assignee: GMA Cover Corp., Marysville, Mich.

[21] Appl. No.: 09/063,415

[22] Filed: Apr. 21, 1998

[51] Int. Cl.$^6$ .................................................. F16G 11/00
[52] U.S. Cl. ..................... 24/115 K; 24/265 H; 24/115 H
[58] Field of Search .................. 24/115 K, 115 G, 24/115 H, 129 A, 164, 165, 265 H

[56] References Cited

U.S. PATENT DOCUMENTS

| | | | |
|---|---|---|---|
| 3,893,399 | 7/1975 | Lewis et al. | 24/115 K X |
| 4,049,357 | 9/1977 | Hamisch, Jr. | 24/115 H X |
| 4,742,602 | 5/1988 | Horner | 24/115 H X |
| 4,974,549 | 12/1990 | Gordon | 24/115 K X |
| 5,345,656 | 9/1994 | Merritt | 24/115 H |
| 5,502,878 | 4/1996 | Anscher | 24/265 H |
| 5,671,508 | 9/1997 | Murai | 24/115 K |

*Primary Examiner*—James R. Brittain
*Assistant Examiner*—Robert J. Sandy
*Attorney, Agent, or Firm*—McDermott, Will & Emery

[57] ABSTRACT

A mechanism for connecting a strap to a fabric includes first and second elements to be disposed cooperatively on opposite sides of the fabric and then securely coupled to each other with the fabric forcibly sandwiched therebetween. At least one of the two elements is provided with a non-bindingly held strap-connecting element to which either a strap is permanently connected by an end loop or which can detachably engage to a detachable strap with any known hook, snap-fastener, or the like.

19 Claims, 3 Drawing Sheets

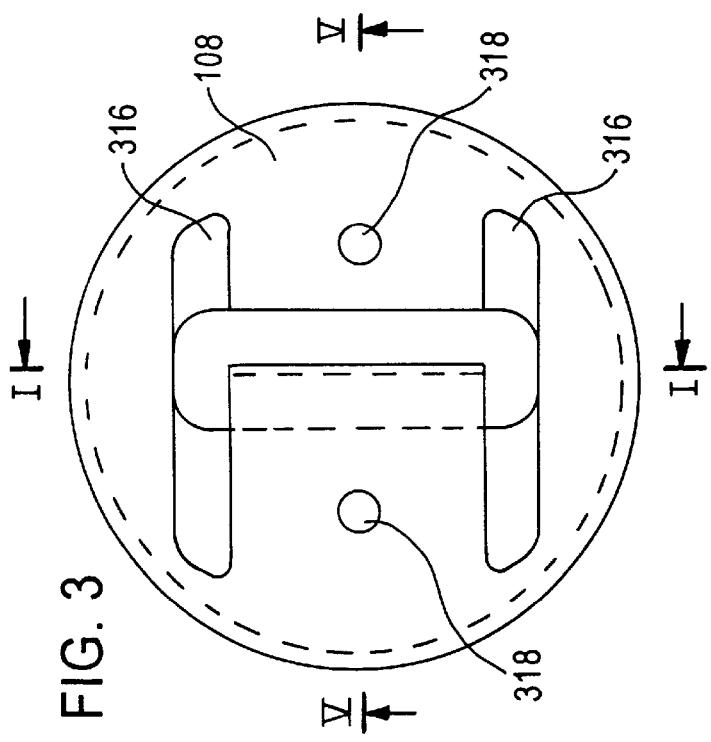
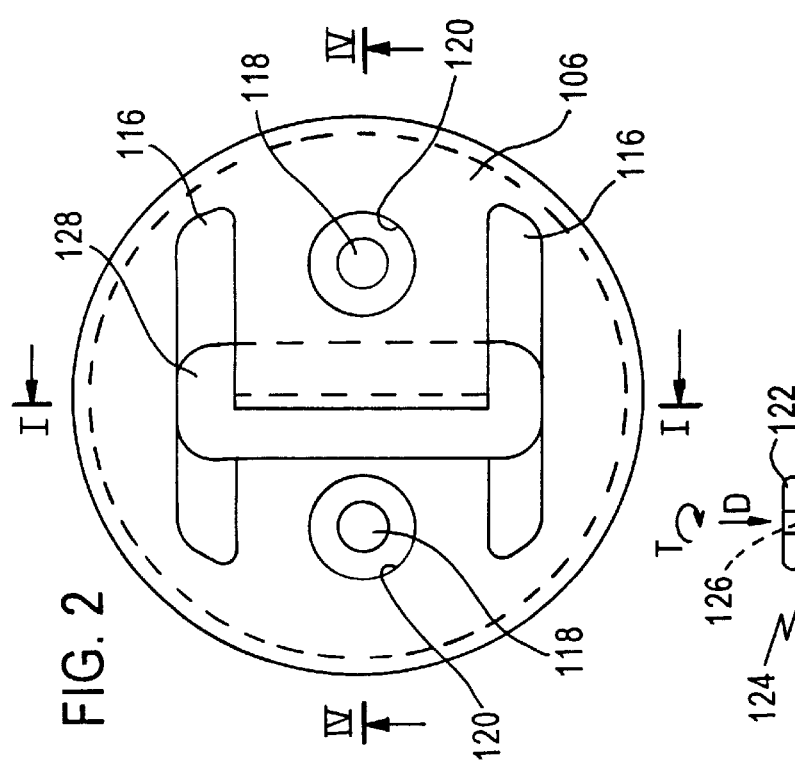
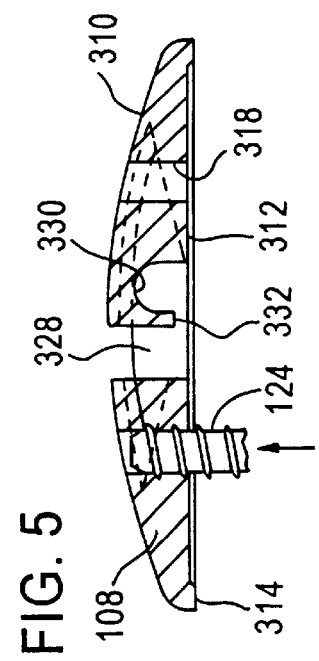
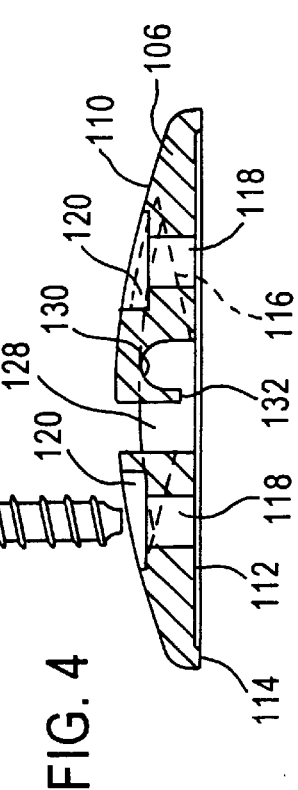

MULTI-PURPOSE STRAP FASTENER

FIELD OF THE INVENTION

This invention relates to a fastener by which one or more straps may be detachably attached to a fabric. More particularly, this invention provides a strong, corrosion-resistant, inexpensive and easily utilized mechanism by which a user may detachably attach one or more webs or straps to one or both sides of one or more sheet-like elements simultaneously.

BACKGROUND OF THE RELATED ART

The need to attach straps, lines, or the like to a piece of fabric (or to more than one piece of fabric simultaneously) arises quite often. Familiar examples include tents, awnings, tarpaulin covers on loads transported on vehicles, backpacks and pool covers. In many of these instances the manufacturer of the item, e.g., a tent, simply sews on or otherwise permanently attaches a short strap or flap sewn together with an attachment to which a conventional hook or snap-fastener element may be attached. The term "strap" is used here in a generic sense and is intended in the present context to comprehend generally flexible elongate elements commonly known as lines, ropes, links, and the like.

There are situations in which a user may want to temporarily or permanently attach one or more webs or straps, at selected locations on one or both sides of one or more sheet-like or fabric elements placed together, to apply stabilizing or support forces to the fabric by also attaching the straps to support elements or the ground. Situations like this may arise, for example, when a relatively large piece of fabric is to be disposed where it will be subjected to strong wind conditions, or to meet unusual temporary needs.

It is important that any mechanism provided for such a purpose comprise elements capable of resisting corrosion due to exposure to ambient moisture and/or contaminants, that it be relatively inexpensive and light in weight so that a person using it in an awkward position is not unduly burdened, and that it be capable of application from either side of a single sheet of fabric or from opposite sides of an assembly of fabrics, one or more of which may actually have the form of a strap itself. Furthermore, such a mechanism must permit a user to readily attach/detach it to one or more straps. It is considered that this overall need is not fully addressed by any known mechanisms.

SUMMARY OF THE INVENTION

Accordingly, it is a principal object of this invention to provide a strong, corrosion-resistant, inexpensive, and easy-to-use mechanism to enable detachable attachment of one or more straps or the like to a fabric.

Another object of the invention is to provide a readily-utilized mechanism by which a user may attach on one or both sides of one or an assembly of fabrics or sheet-like elements one or more straps provided with known end hooks, snap fasteners, or the like.

These and other related objects of the invention are realized by a mechanism for fastening a strap to a fabric, which includes a first element and a second element, each element having a respective body defined by a convex outer side, an inner side, and a periphery free of sharp edges. The mechanism includes means for coupling the first and second elements to each other with their inner sides facing each other and with the fabric forcibly sandwiched securely therebetween. Strap-connecting means are connected to at least one of the first and second elements for connecting to a strap.

These and other aspects, features and advantages of the invention will be better understood with reference to the detailed description and the related drawing figures appended hereto.

DETAILED DESCRIPTION OF THE DRAWING

FIG. 2 is a plan view of a first side of a first element in the fastener mechanism per FIG. 1.

FIG. 3 is a plan view of a second side of the first element in the fastener mechanism per FIG. 1.

FIG. 4 is a partial transverse cross-sectional view of the first element of the fastener mechanism per FIG. 1, at Section IV—IV, with an exemplary self-tapping screw.

FIG. 5 is a partial transverse cross-sectional view of the second element of the fastener mechanism per FIG. 1, at Section V—V, with an end portion of an exemplary screw self-tapped into engagement therein.

DETAILED DESCRIPTION OF THE PREFERRED EMBODIMENTS

Figure 1:
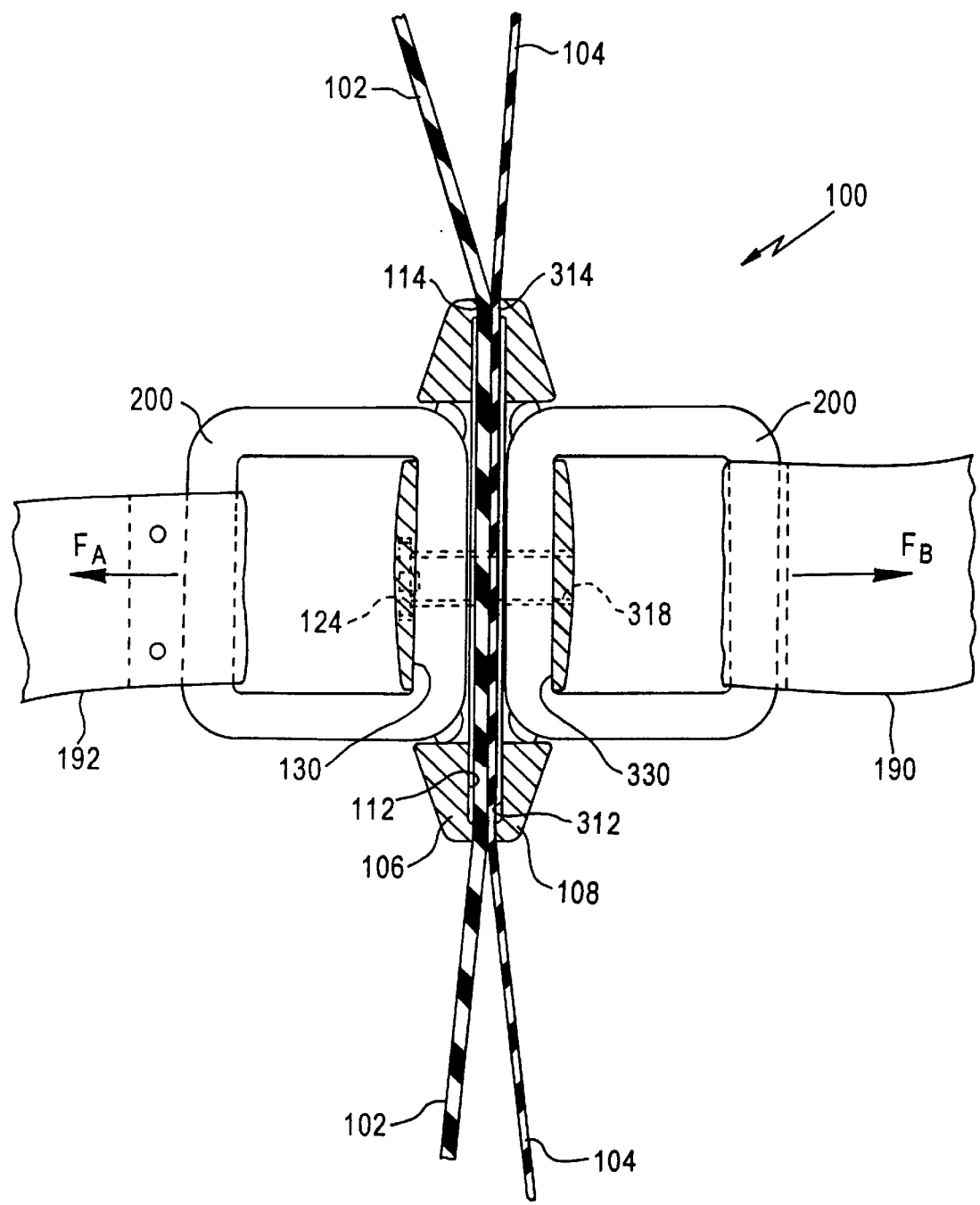
FIG. 1 is a transverse cross-sectional view, at Section I—I, of a preferred embodiment of the fastener mechanism as attached to hold together and be simultaneously affixed to two exemplary sheet-like elements.

A preferred embodiment of this invention is seen in partial transverse cross-sectional view in FIG. 1. The fastener device 100 in the preferred embodiment comprises only six elements which are put into operative assembly for use at a chosen position as described below.

In the exemplary application illustrated in FIG. 1, the fastener assembly 100 is employed to hold together and simultaneously attach to a pair of sheet-like elements 102 and 104. There is, obviously, no restriction intended on the size, shape, or thickness of these sheet-like elements which may, for example, be two pieces of fabric, a strap and a fabric, a metal sheet and another metal sheet, or virtually any two elements that are relatively thin where the fastener assembly is to be deployed for use.

Fastener assembly 100 comprises two, preferably round, cap-like elements 106 and 108 which may be made of any known material that can be formed economically, e.g., by molding, pressing, or the like. Elements 106 and 108, in operative position, must be disposed directly opposite to each other across the thickness or combined thicknesses of any sheet-like element(s) to which the fastener is to be attached.

Although elements 106 and 108 are illustrated in FIGS. 2 and 3 as being circular in plan view, this is not intended to be restrictive, i.e., other suitable matching shapes for the two elements may be considered and may even be found preferable for particular applications. Cap-like elements 106 and 108 have generally similar geometries, and need to differ in only one respect, namely in how each of them accommodates a corresponding portion of each of at least two screws (or functionally comparable elements) which forcibly hold the elements 106 and 108 to each other with the sheet-like material sandwiched therebetween.

As best seen in FIGS. 2 and 4, cap-like element 106 preferably has a smoothly curved convex outer surface 110 and a recessed central portion 112 surrounded by an outer base rim 114. Two shallow parallel grooves 116, 116 are formed inwardly of curved convex surface 110. Between recesses 116, 116, and preferably symmetrically about the center, are provided two through-holes 118, 118 each of which has a recess 120 shaped and sized to substantially receive therein the head 122 of a self-tapping screw 124.

Each screw 124 is preferably provided with a driving-tool receiving recess 126 into which a distal end of a rotation-providing tool (not shown), e.g., like a conventional Allen-key, may be inserted to provide a driving torque. The provision of such a torque, as generally indicated by the curved arrow "T" should generate a driving force as indicated by the straight arrow "D". Each screw 124 is selected to have a maximum thread diameter slightly smaller than the corresponding through hole 118 through which it is to be inserted into cap-like element 106.

Although self-tapping screws 124, 124 are preferred, a large variety of functional equivalents exist and may be used instead. Such known means include, for example, screws tightened into preformed internal threads in cap-like element 108, screw-and-nut assemblies with or without washers and/or locknuts, solid rivets, hollow rivets (of the type generally known as "pop rivets"), split pins, and modifications of such commonly available means for affixing things to each other. While means such as screws are often used for temporary affixation, they can also be left in place and function as permanent affixation means in the present context. The modifications to the cap-like elements 106, 108 to accommodate one or the other of the above-mentioned exemplary affixing means are minimal and are considered well within the capability of persons of ordinary skill in the mechanical arts.

Cap-like element 106 is also provided with a "C"-shaped through-hole 128, located so that its central relatively long portion is perpendicular to the parallel grooves 116, 116. The two shorter arms of the "C"-shape are aligned and coincidental with the two grooves 116, 116, as best seen in FIG. 2. Furthermore, the distal ends of the two short arms of "C"-shaped hole 128 are joined by a recess 130 formed into the concave base 112 of cap-like element 106. This, in effect, creates an elongate lip 132 extending between grooves 116, 116 and disposed between the long central arm of the "C"-shaped hole and the parallel recess 130 adjacent thereto. Lip 132 is formed so that it does not extend all the way to the recessed base 112, as best seen in FIG. 4.

The other cap-like element 108, as best seen in FIGS. 3 and 5, has a geometry very similar to that of cap-like element 108. Thus, cap-like element 108 has a smooth curved convex outer surface 310, a central recessed base portion 312 surrounded by a peripheral rim portion 314, and has two parallel grooves 316, 316. Symmetrically disposed along a diameter between the parallel grooves 316, 316 are provided two through holes 318, 318 which are preferably sized to be such that the threads of screw 124 must forcibly bite into the material of cap-like element 108 when a driving torque "T" is applied to the screw. This is intended to ensure a tight, difficult-to-loosen, affixation by forcible torqueing of each of the screws to thereby cause the cap-like elements 106, 108 to press very firmly towards each other. When this is done, as best understood with reference to FIG. 1, the rim portions 114 and 314 pressed from opposite sides onto surfaces of the sheet-like material sandwiched between cap-like elements 106 and 108. Cap-like element 108 also has its own "C"-shaped through-hole 328, recess 330 and lip 332 of shape, size and disposition matching those of corresponding features of cap-like element 106.

As persons of ordinary skill in the mechanical arts will appreciate from a review of FIG. 1, when two screws 124 are employed as described above, and are forcibly torqued to draw together the cap-like elements 106 and 108 towards each other, there will inevitably be some flexing of the cap-like elements because of their respective recessed base portions 112, 312. This is intentional, and by appropriate selection of the material of the cap-like elements 106 and 108, a certain firm resiliency can thus be built into the structure. This, coupled with the fact that the outer surfaces of the rim portions 112, 312 are made deliberately smooth, will ensure that there is ample area of contact between the cap-like elements 106 and 108 cooperating with each other and any sheet-like element(s) sandwiched therebetween. This should avoid the generation of destructively high local stresses in the sheet-like material and is important because it is quite possible that during contemplated use there will be forces conveyed by external straps, lines or the like, through the fastener structure to the sandwiched sheet-like materials. Contemplated uses could include applications under severe ambient temperature conditions, e.g., from very low temperatures in arctic regions to very high temperatures in deserts. Very low temperatures could cause the sheet-like material to become brittle and therefore more likely to break if there are local stresses generated by sharp edges or the like in addition to the compression forces generated by the torqueing of the screws holding cap-like elements 106 and 108 to each other. Similarly, high temperatures could cause certain fabrics, e.g., rubberized cloth, to become weaker and thus more vulnerable to local stress-raisers. The present invention is intended to be utilized in a wide variety of circumstances and, therefore, it is important that its surfaces are smooth and free of sharp local discontinuities where they can contact relatively vulnerable sheet-like materials.

The reason for providing the "C"-shaped through-holes 128, 328 in cap-like elements 106, 108 will be readily appreciated from a reference to FIG. 1. Two preferably rectangular-shaped load rings 200, 200 are included in the fastener structure, and are initially positioned so that one long side of each rests within corresponding recess 130 in cap-like element 106 and 330 in cap-like element 108. Each ring 200 has a transverse cross-section which is preferably circular and sized so that it is received non-bindingly within the corresponding groove 130 or 330. Also, the rings are sized so that there is no binding between the shorter opposed parallel sides and the material of cap-like elements 106 and 108 between their corresponding opposed grooves 116, 116 or 316, 316. In essence, it is intended that the rings 200, 200 be readily fittable into the corresponding cap-elements 106 or 108 before the latter are screwed to each other so as to sandwich the sheet-like material 102, 104 therebetween. The rings, thereafter, are intended to be non-bindingly but not too loosely held to the assembled structure. They thereby permit affixation, either permanently or temporarily, in any known manner, of straps 190, 192, lines, or the like to apply forces $F_a$ and $F_b$, as best seen in FIG. 1. Obviously, one or the other of the rings 200 may be entirely omitted or left unloaded for a particular application.

As noted earlier, it is intended that all the elements of fastener structure 100 be capable of withstanding normal use and abuse, e.g., impact with hard sharp objects, and be capable of resisting ambient corrosion-causing moisture, chemicals and the like. The various elements themselves can be readily molded or formed in any known manner, and the desired smooth surfaces and feasibly precise dimensions can easily be obtained without particular difficulty. Suitable materials for the cap-like elements 106 and 108 include but are not limited to hard plastics such as glass-filled nylon, which will permit the fastener structure to be functional in a very wide range of temperatures, e.g., from −50° F. to 125° F. Obviously, metals such as aluminum, or composites, may also be used.

A suitable diametral size for the cap-like elements is about 2 in., with the rings having longer sides of about 1.25 in. in length and about 3–16 in. in cross-sectional diameter. The rings themselves may be made of the same glass-filled nylon material as the cap-like elements 106, 108. The screws 124, 124, for this particular size of fastener are preferably each #10 by ½ in. length, self-tapping amortized screws. For such screws, having flat heads with central drive-tool receiving recesses, recesses 120, 120 in cap-like element 106 may need to be of about 1/16 in. in minimum depth.

As will be readily appreciated, if any of the elements of fastener assembly 100 become severely scratched, deformed, or otherwise distresses during use, that element can be readily detached from the others and replaced in the field without undue effort or expense. Thus, with only a few spare parts, a number of such fastener assemblies can be readily serviced under otherwise difficult conditions, e.g., during war time, in difficult weather such as a hurricane or storm, etc. Even further, if glass-filled nylon material or other strong hard plastic material is used, the cap-like elements 106, 108 may be individually color-coded to provide useful information to a person viewing the same.

Figure 6:
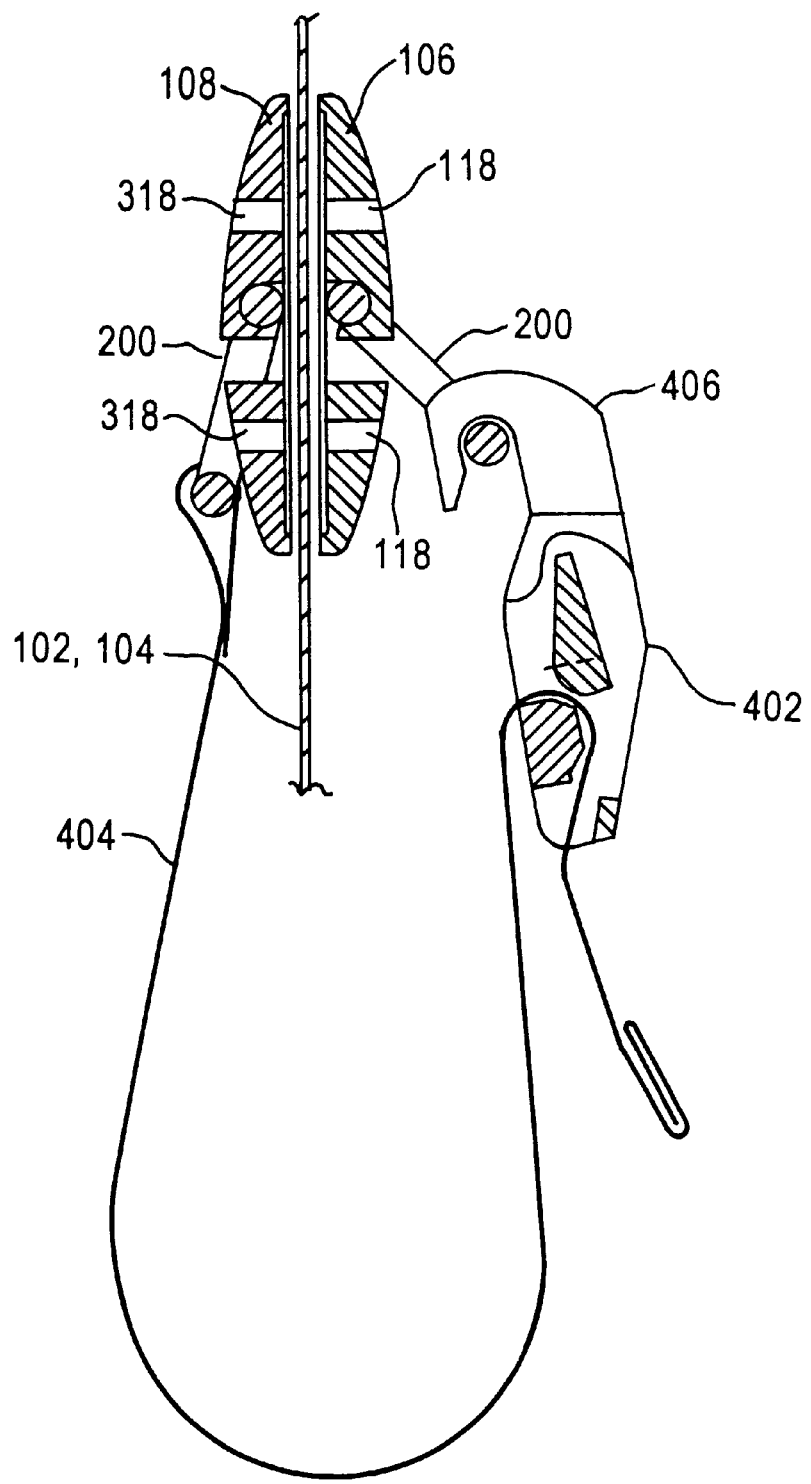
FIG. 6 is a cross-sectional view of the fastener mechanism attached to a material with a webbing connecting rings of the fastener mechanism.

For use of the fastener 100 in a particular application, the user would need only to select a location for cap-like element 106 on a given expanse of sheet-like element(s), mark locations thereon for screws 124, 124 that are to pass through the holes 118, 118 and, using a sharp instrument such as a Phillips-head screwdriver or the like, to poke in two small holes through the sheet-like element(s). Two screws 124, 124 may then be passed via the holes 118, 118, a load ring 200 positioned within the recess 130, and the threaded ends of the screws turned to thread into and through the holes made in the sheet-like element(s). The other cap-like element 108 may then be held opposite, guided by the presence of the distal ends of the threaded screws 124, 124 projecting through the sheet-like element(s), and the screws thereafter tightened. If another load ring 200 is to be utilized with the cap-like element 108 it must be located before the screws are tightened. If one or both of the rings 200 are provided with sewn-on or otherwise permanently affixed belts, lines or the like, the user would then need only to tighten and securely attach the opposite ends to suitable supports. FIG. 6 shows an example of an arrangement where one end of a webbing material 404 (strap or line) is permanently attached, e.g. sewn, to one ring 200. The other end of the webbing material 404 adjustably engages a known huckle buckle 402 in any well known manner (e.g., like a seat belt) enabling the webbing material to be tightened and loosened. The huckle buckle 402 has a hook end 406 for detachable engagement with the other ring 200. While the hook end 406 detachably engages with the other ring 200, one end of another piece of webbing material could be permanently attached to this other ring 200 and the other end of the webbing could have be permanently attached, e.g. sewn, to another rectangular-shaped load ring for detachable engagement with the hook end 406 of huckle buckle 402. Alternatively, any known snap-type fitting may be provided at the distal end of a strap, line or the like, and the same attached to one or the other of load rings 200 for detachable affixation thereat.

A user could utilize a plurality of fasteners 100, with or without rings 200, simply to temporarily couple two or more sheet-like elements securely to each other.

Although the present invention has been described and illustrated in detail, it should be clearly understood that the same is by way of illustration and example only and is not to be taken by way of limitation, the spirit and scope of the present invention being limited only by the terms of the appended claims.

What is claimed is:

1. A mechanism for fastening a strap to a fabric, comprising:
   a first element, having a body defined by a first convex outer side, a first inner side, and a first periphery free of sharp edges;
   a second element, having a body defined by a second convex outer side, a second inner side, and a second periphery free of sharp edges, the inner sides of both the first and second elements comprise concave portions respectively defined within the first and second peripheries;
   means for coupling the first and second elements to each other with their inner sides facing each other and for fabric to be forcibly sandwiched securely therebetween; and
   at least one strap-connecting element connected to at least one of the first and second elements for connecting to a strap.

2. The mechanism according to claim 1, wherein:
   the first and second elements, the means for coupling the first and second elements, the strap-connecting element, and the at least one strap are all made from respective materials resistant to moisture and corrosion.

3. The mechanism according to claim 1, wherein:
   the means for coupling the first and second elements to each other include at least one self-tapping screw passed through one of the first and second elements and the sandwiched fabric and threadedly engaged with the other of the first and second elements.

4. The mechanism according to claim 1, wherein:
   the at least one strap-connecting element comprises a ring pivotably supported to one of the first and second elements.

5. The mechanism according to claim 1, wherein:
   the first and second elements are made of a strong corrosion-resistant material.

6. The mechanism according to claim 5, wherein:
   the material of the first and second elements comprises a glass-filled nylon.

7. The mechanism according to claim 1, wherein:
   the at least one strap-connecting element comprises a rectangular ring, and at least one of the first and second elements is formed to non-bindingly retain a portion of the ring.

8. The mechanism according to claim 7, wherein:
   one of the first and second elements is provided with two surface recesses opening to respective first through apertures;
   the other of the first and second elements is provided with two second apertures in respective positions corresponding to the first through apertures of said one of the first and second elements; and
   the first and second elements are coupled by two self-tapping screws, with respective heads located within the recesses and threaded shanks respectively passed via the first through apertures and the sandwiched fabric to tap into and engage with corresponding second apertures.

9. The mechanism according to claim 1, wherein:
   the first and second elements are provided with respective first and second rings connected to corresponding straps, whereby the fabric is to be coupled to at least one strap on each side.

10. The mechanism according to claim 1, wherein:

the first and second elements are coupled to each other by at least one screw which is passed through one of the first and second elements and the sandwiched fabric and is threadedly engaged with the other of the first and second elements;

the at least one strap-connecting element comprises a ring pivotably supported to one of the first and second elements; and the material of the first and second elements comprises a glass-filled nylon.

11. The mechanism according to claim 10, wherein:

one of the first and second elements is provided with two surface recesses opening to respective first through apertures;

the other of the first and second elements is provided with two second apertures in respective positions corresponding to the first through apertures of said one of the first and second elements; and the first and second elements are coupled by two self-tapping screws, with respective heads located within the recesses and threaded shanks respectively passed via the first through apertures and the sandwiched fabric to tap into and engage with corresponding second apertures.

12. The mechanism according to claim 1, wherein:

the first and second peripheries are directly opposed to each other on opposite sides of the fabric, so that the fabric is sandwiched at least along and around the peripheries.

13. The mechanism according to claim 1, wherein:

the fabric comprises a plurality of overlapping fabric layers forcibly held to each other by the coupled first and second elements.

14. The mechanism according to claim 1, wherein:

the at least one strap-connecting element comprises a hook mechanism attached to the strap.

15. The mechanism according to claim 1, further comprising:

at least one strap having a first end connected to the at least one strap-connecting element and a second end adjustably attached to a connecting mechanism; and an attaching element connected to the other of the first and second elements and being configured to engage the connecting mechanism, wherein the at least one strap connected to the at least one strap-connecting element can be adjusted via the connecting mechanism engaging the attaching element connected to the other of the first and second elements to provide a corresponding force to the first and second elements.

16. The mechanism according to claim 1, further comprising:

at least one strap having a first end for permanently connecting to the at least one strap-connecting element and a second end formed for connecting to another strap-connecting element.

17. The mechanism according to claim 16, wherein:

the at least one strap-connecting element comprises a rectangular ring, non-bindingly retained to one of the first and second elements.

18. The mechanism according to claim 1, wherein:

at least one of the first and second elements is formed to have a generally C-shaped aperture located substantially centrally of the corresponding periphery and sized to non-bindingly receive a portion of the strap connection element.

19. The mechanism according to claim 18, wherein:

the first and second elements each have the C-shaped aperture shaped and sized to receive therethrough a portion of the at least one strap-connecting element.

* * * * *